(12) United States Patent
Otenti et al.

(10) Patent No.: US 11,994,407 B2
(45) Date of Patent: May 28, 2024

(54) EVALUATION OF A GROUND REGION FOR LANDING A ROBOT

(71) Applicant: AURORA FLIGHT SCIENCES CORPORATION, Manassas, VA (US)

(72) Inventors: Nathan Otenti, Brighton, MA (US); Joseph Chung, Cambridge, MA (US); Jeffery Saunders, Quincy, MA (US)

(73) Assignee: Aurora Flight Sciences Corporation, a subsidiary of The Boeing Company, Manassas, VA (US)

( * ) Notice: Subject to any disclaimer, the term of this patent is extended or adjusted under 35 U.S.C. 154(b) by 312 days.

(21) Appl. No.: 17/148,164

(22) Filed: Jan. 13, 2021

(65) Prior Publication Data

US 2022/0034681 A1 Feb. 3, 2022

Related U.S. Application Data

(60) Provisional application No. 63/059,396, filed on Jul. 31, 2020.

(51) Int. Cl.
*G01C 21/00* (2006.01)
*G05D 1/00* (2006.01)
(Continued)

(52) U.S. Cl.
CPC ......... *G01C 21/3826* (2020.08); *G05D 1/101* (2013.01); *G06F 17/16* (2013.01); *G06F 18/232* (2023.01); *G06V 20/13* (2022.01)

(58) Field of Classification Search
CPC .... G01C 21/3826; G06V 20/13; G05D 1/101; G06F 17/16; G06K 9/622
See application file for complete search history.

(56) References Cited

U.S. PATENT DOCUMENTS 9,557,742 B2    1/2017  Paduano
9,701,408 B1 *  7/2017  Willison ............... G01C 9/005
(Continued)

FOREIGN PATENT DOCUMENTS

CN    109597415 A  *  4/2019  .......... G05D 1/0214

OTHER PUBLICATIONS

"Scherer et al., Autonomous landing at unprepared sites by a full-scale helicopter, Sep. 20, 2012, Elsevier Robotics and Autonomous Systems 60, 1545-1562" (Year: 2012).*

(Continued)

*Primary Examiner* — Dale W Hilgendorf
*Assistant Examiner* — Frank T Glenn, III
(74) *Attorney, Agent, or Firm* — Quinn IP Law

(57) ABSTRACT

A method of supporting robot(s) landing within a ground region is provided. The method includes accessing a map in which the ground region is tessellated into cells covering respective areas of the ground region. Each cell is classified as feasible to indicate a respective area is feasible for landing, or infeasible to indicate the respective area is infeasible for landing. The map is searched for clusters of adjoining cells that are classified as feasible, covering clusters of adjoining areas that define sub-regions within the ground region that are feasible for landing. The sub-regions are ranked according to a cost metric, and one of the sub-regions is selected according to the ranking. A geographic position of the selected sub-region is then output for use in at least one of guidance, navigation or control of the robot(s) to land at the selected sub-region within the ground region.

20 Claims, 11 Drawing Sheets

(51) Int. Cl.
  *G06F 17/16* (2006.01)
  *G06F 18/232* (2023.01)
  *G06V 20/13* (2022.01)

(56) References Cited

U.S. PATENT DOCUMENTS

| | | | | |
|---|---|---|---|---|
| 10,198,955 | B1* | 2/2019 | Boyd | G08G 5/045 |
| 10,453,351 | B2 | 10/2019 | Choi et al. | |
| 2015/0170526 | A1* | 6/2015 | Wang | G01S 17/86 |
| | | | | 701/16 |
| 2016/0114905 | A1 | 4/2016 | Derenick et al. | |
| 2017/0019479 | A1 | 1/2017 | Rangarajan et al. | |
| 2019/0095725 | A1 | 3/2019 | Kalghatgi et al. | |
| 2019/0248487 | A1* | 8/2019 | Holtz | G06V 10/764 |
| 2019/0324456 | A1 | 10/2019 | Saunders | |
| 2020/0118446 | A1 | 4/2020 | Saunders | |
| 2022/0055748 | A1* | 2/2022 | Zheng | G05D 1/101 |

OTHER PUBLICATIONS

Extended European Search Report dated Dec. 23, 2021 in the corresponding European Application No. 21187647.9, 10 pages.
Scherer, S., et al. Autonomous landing at unprepared sites by a full-scale helicopter. Robotics and Autonomous Systems, Robotics Institute, Carnegie Mellon University, Pittsburgh, PA, 2012, pp. 1545-1562. <DOI: 10.1016/i_robot_2012.09.004>.
Ogren, P. "Increasing Modularity of UAV Control Systms using Computer Game Behavior Trees", American Institute of Aeornautics and Astronautics, Sep. 2012, pp. 1-8.
"Behavior tree (artificial intelligence, robotics and control)", Wikipedia, Dec. 2020, retrieved from https://en.wikipedia.org/w/index.phptitle= Behavior_tree_(artificial_intelligence,_robotics_and_control) oldid= 994954127.
Davies, J. et al., "Comparative Analysis of ACAS-Xu and DAIDALUS Detect-and-Avoid Systems", NASA, Feb. 2018, pp. 1-36.
Munoz, C. et al., "DAIDALUS: Detect and Avoid Alerting Logic for Unmanned Systems", NASA. Sep. 2015, pp. 1-12.
"Maximal Square", LeetCode Articles, Jul. 14, 2016, Retrieved on Mar. 26, 2020 from https://leetcode.com/articles/maximal-square.

* cited by examiner

EVALUATION OF A GROUND REGION FOR LANDING A ROBOT

CROSS-REFERENCE TO RELATED APPLICATION(S)

This application claims priority to U.S. Provisional Application No. 63/059,396, filed Jul. 31, 2020, entitled Evaluation of a Ground Region for Landing a Robot, the content of which is incorporated herein by reference in its entirety.

TECHNOLOGICAL FIELD

The present disclosure relates generally to robotics and, in particular, to one or more of the design, construction, operation or use of autonomous robots such as autonomous or semi-autonomous vehicles.

BACKGROUND

Many modern robots and other machines are designed to operate with increased autonomy and are less reliant on weld-trained operators to safely operate. Some of these modern robots are manned while others are unmanned. In particular, a variety of unmanned vehicles include unmanned ground vehicles (UGVs), unmanned aerial vehicles (UAVs), unmanned surface vehicles (USVs), unmanned underwater vehicles (UUVs), unmanned spacecraft and the like. The use of unmanned vehicles has grown in recent years and these unmanned vehicles are employed in a wide variety of applications, including both military and civilian uses.

One focus in the field of robotics is in the improvement of autonomy, which often includes multiple aspects of robot operation. These aspects of robot operation include automatic control of a given robot to support remote human control. Another aspect is optimization systems (and associated methods) to determine how, for a given robot or set of robots, tasks should be ordered and/or allocated. And yet another aspect of robot operation is automatic, real-time or near real-time data processing, and exploitation in support of automatic route planning, mission execution and other activities.

Despite advancements, existing autonomy systems are typically configured to address only one aspect of these activities, thereby focusing its design of the underling autonomy algorithms and software architecture on a narrow mission set. This limits the extensibility of existing autonomy systems, as they are not well-equipped to support the addition of new modules to the autonomy system. Furthermore, existing autonomy systems may or may not be structured for rapid adaptation to new platforms through parameterization.

Therefore it would be desirable to have a system and method that takes into account at least some of the issues discussed above, as well as other possible issues.

BRIEF SUMMARY

Example implementations of the present disclosure are directed to selection of a sub-region within a ground region that is feasible for landing a robot such as an aerial robot. According to example implementations, the ground region is searched for sub-regions that are feasible for landing. The sub-regions are ranked according to a cost metric, and perhaps also a categorization of the sub-regions. One of the sub-regions is selected according to the ranking (e.g., the highest-ranked sub-region), and a geographic position of the selected sub-region is output for use to land one or more robots at the selected sub-region.

The present disclosure thus includes, without limitation, the following example implementations.

Some example implementations provide a method of supporting one or more robots within a ground region, the method comprising accessing a map in which the ground region is tessellated into cells covering respective areas of the ground region, and each cell is classified as feasible to indicate a respective area is feasible for landing, or infeasible to indicate the respective area is infeasible for landing; searching the map for clusters of adjoining cells that are classified as feasible, covering clusters of adjoining areas that define sub-regions within the ground region that are feasible for landing; ranking the sub-regions according to a cost metric; and selecting one of the sub-regions according to the ranking, the one of the sub-regions thereby a selected sub-region.

In some example implementations of the method of any preceding example implementation, or any combination of any preceding example implementations, the method further comprises outputting a geographic position of the selected sub-region for use in at least one of guidance, navigation or control of the one or more robots to land at the selected sub-region within the ground region.

In some example implementations of the method of any preceding example implementation, or any combination of any preceding example implementations, the method further comprises constructing the map, constructing the map including receiving terrain data that describes terrain of the respective areas, the terrain described in terms of one or more parameters including one or more of elevation, roughness or surface normal; performing an evaluation of the respective areas as feasible or infeasible for landing based on the terrain data; and constructing the map in which the cells into which the ground region is tessellated are classified as feasible or infeasible based on the evaluation.

In some example implementations of the method of any preceding example implementation, or any combination of any preceding example implementations, receiving the terrain data includes receiving one or more terrain datasets, each terrain dataset describing the terrain of the respective areas in terms of a respective one of the one or more parameters, and wherein performing the evaluation includes comparing data of the terrain dataset with a corresponding parameter threshold that defines a boundary between feasible and infeasible in terms of the respective one of the one or more parameters, the corresponding parameter threshold being set based on one or more constraints of the one or more robots.

In some example implementations of the method of any preceding example implementation, or any combination of any preceding example implementations, the one or more parameters are a plurality of parameters, and receiving the terrain data includes receiving a plurality of terrain datasets, each terrain dataset describing the terrain of the respective areas in terms of a respective one of the plurality of parameters, and wherein performing the evaluation includes determining scores of the respective areas from the plurality of terrain datasets, and comparing the scores with a corresponding threshold score that defines a boundary between feasible and infeasible, the corresponding threshold score being set based on one or more constraints of the one or more robots.

In some example implementations of the method of any preceding example implementation, or any combination of any preceding example implementations, receiving the terrain data includes receiving one or more terrain datasets embodied as one or more characteristic maps of the ground region.

In some example implementations of the method of any preceding example implementation, or any combination of any preceding example implementations, the map is expressed as a matrix of first values and second values arranged in the cells to cover the respective areas of the ground region, the first values representing those of the cells classified as feasible, and the second values representing those of the cells classified as infeasible, and wherein searching the map includes searching the matrix for the clusters expressed as sub-matrices with all first values.

In some example implementations of the method of any preceding example implementation, or any combination of any preceding example implementations, the matrix is a first matrix of the first values and the second values that are elements of the first matrix, and searching the matrix includes initializing a second matrix that corresponds to the first matrix; and traversing the first matrix beginning at a top left-most one of the elements of the first matrix, and for each element of the first matrix having the first value, updating a value of a corresponding element of the second matrix, wherein after the first matrix is traversed, the value of the corresponding element of the second matrix defines a square sub-matrix having a size of the value in each dimension.

In some example implementations of the method of any preceding example implementation, or any combination of any preceding example implementations, searching the matrix includes searching the matrix for the sub-matrices with all first values that are also of a target size or within a target range of sizes set based on one or more constraints of the one or more robots.

In some example implementations of the method of any preceding example implementation, or any combination of any preceding example implementations, ranking the sub-regions includes ranking the sub-regions in which one of the sub-regions designated as nominal is ranked first, and others of the sub-regions are ranked according to the cost metric that includes distance from the others of the sub-regions to the nominal.

In some example implementations of the method of any preceding example implementation, or any combination of any preceding example implementations, ranking the sub-regions includes categorizing the sub-regions into categories to which the sub-regions belong, and ranking the sub-regions according to an order of priority of the categories.

Some example implementations provide an apparatus for supporting one or more robots within a ground region, the apparatus comprising a memory having computer-readable program code stored therein; and processing circuitry configured to access the memory, and execute the computer-readable program code to cause the apparatus to at least perform the method of any preceding example implementation, or any combination of any preceding example implementations.

Some example implementations provide a computer-readable storage medium for supporting one or more robots within a ground region, the computer-readable storage medium being non-transitory and having computer-readable program code stored therein that, in response to execution by processing circuitry, causes an apparatus to at least perform the method of any preceding example implementation, or any combination of any preceding example implementations.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

Figure 3:
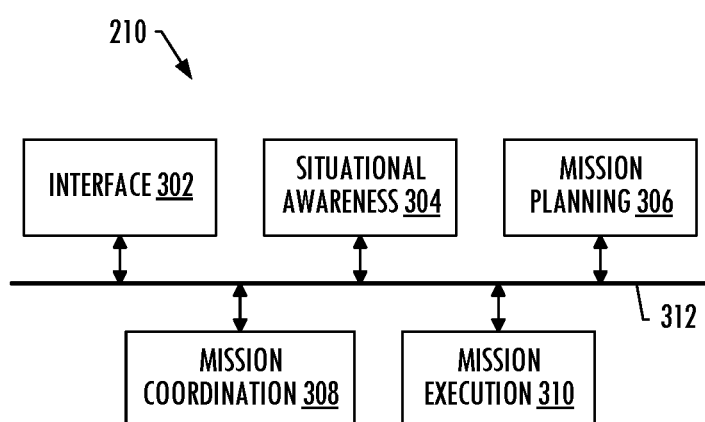
Figure 4:
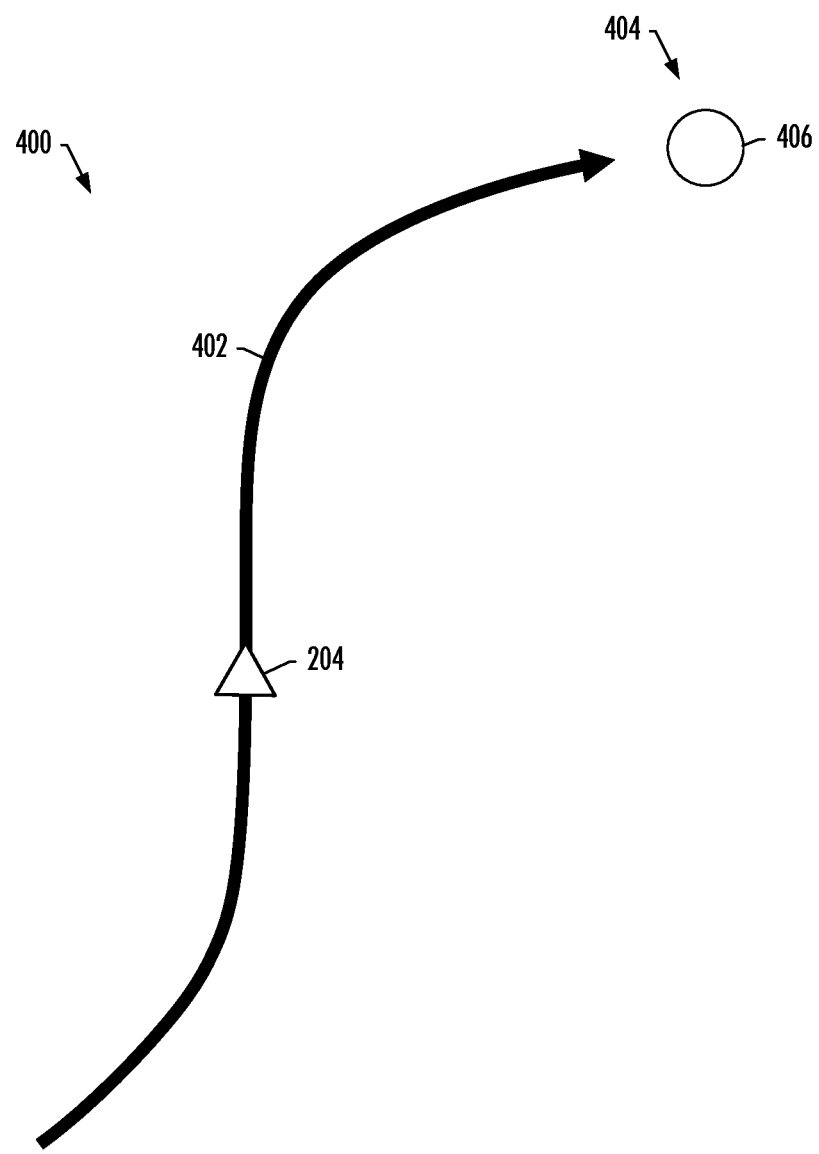
Figure 5:
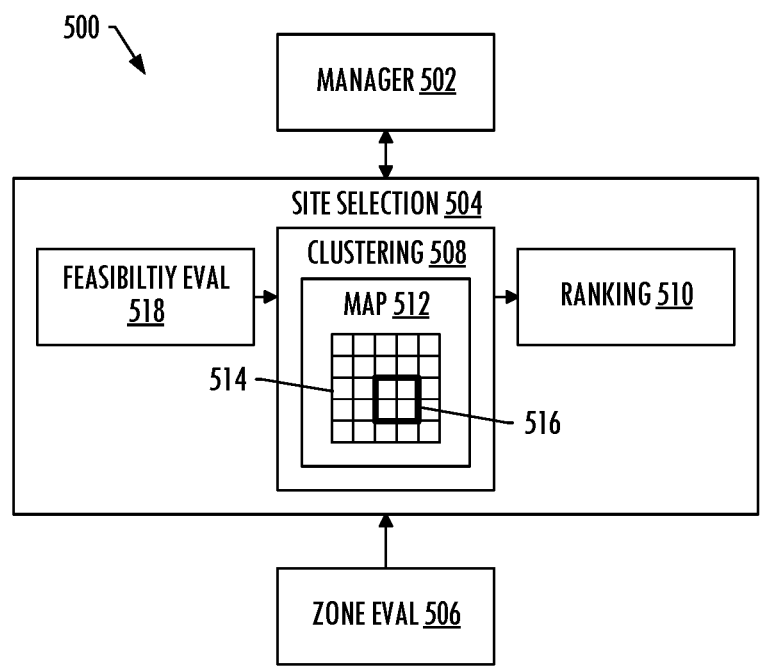
Figure 6:
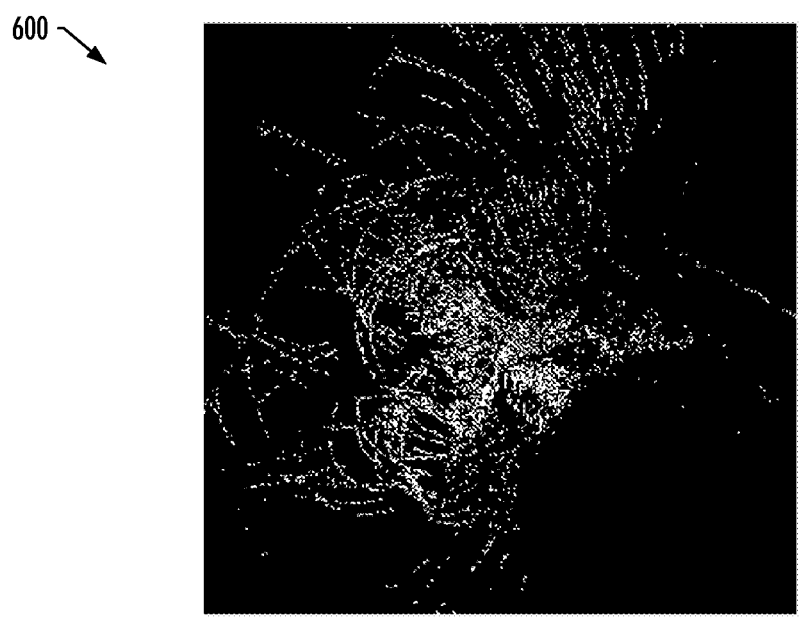
Figure 7:
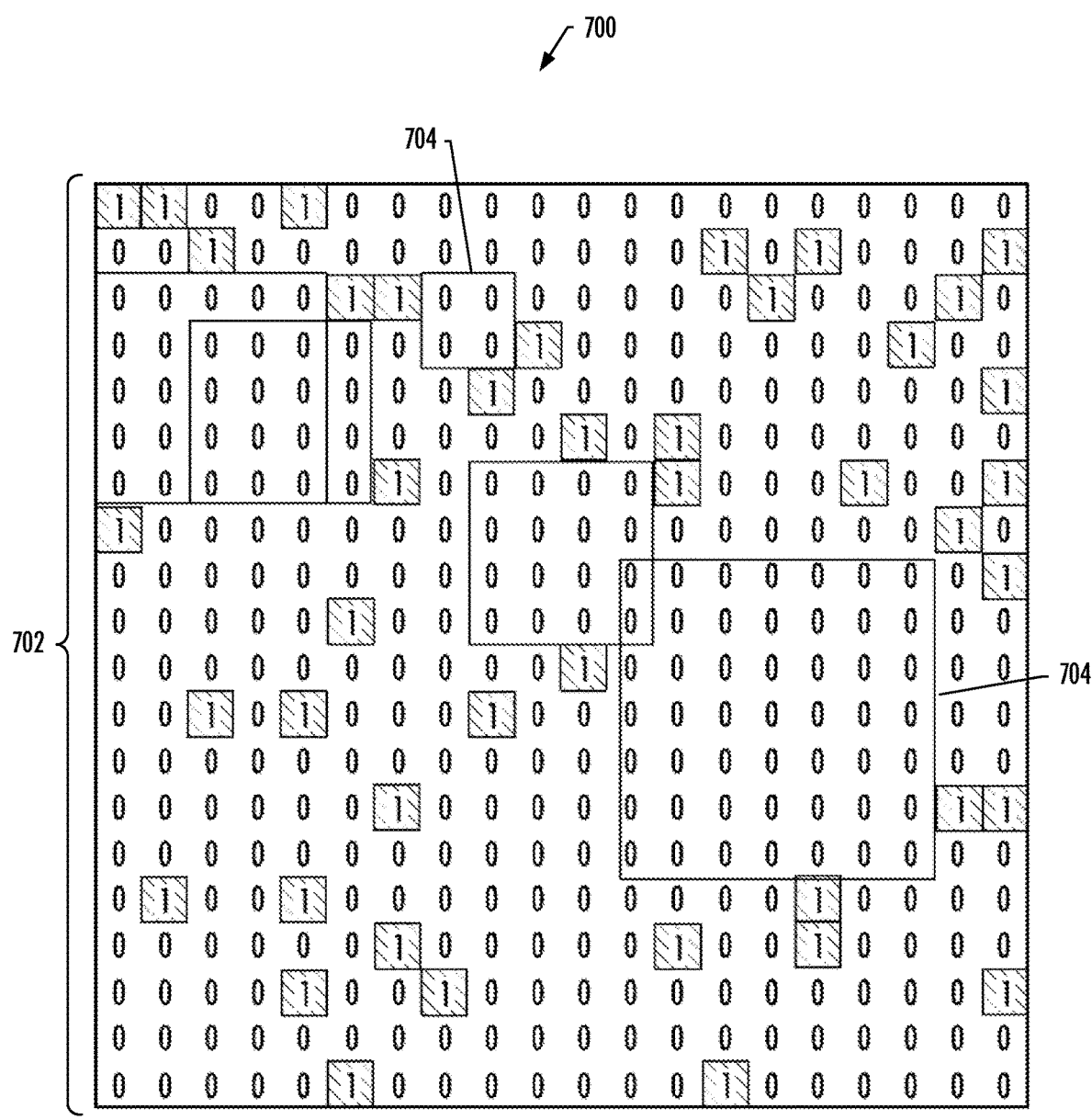
Figure 8:
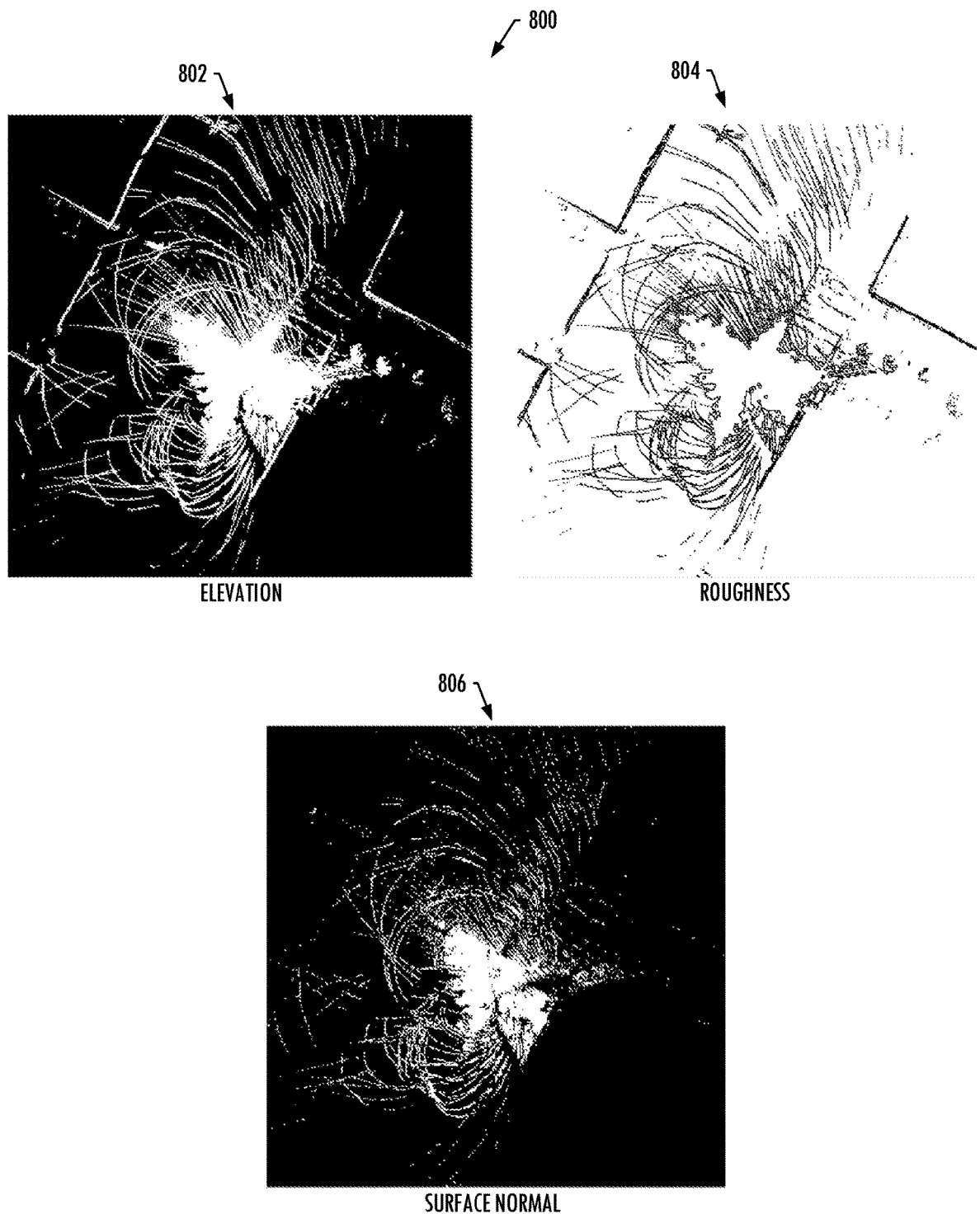
Figure 9:
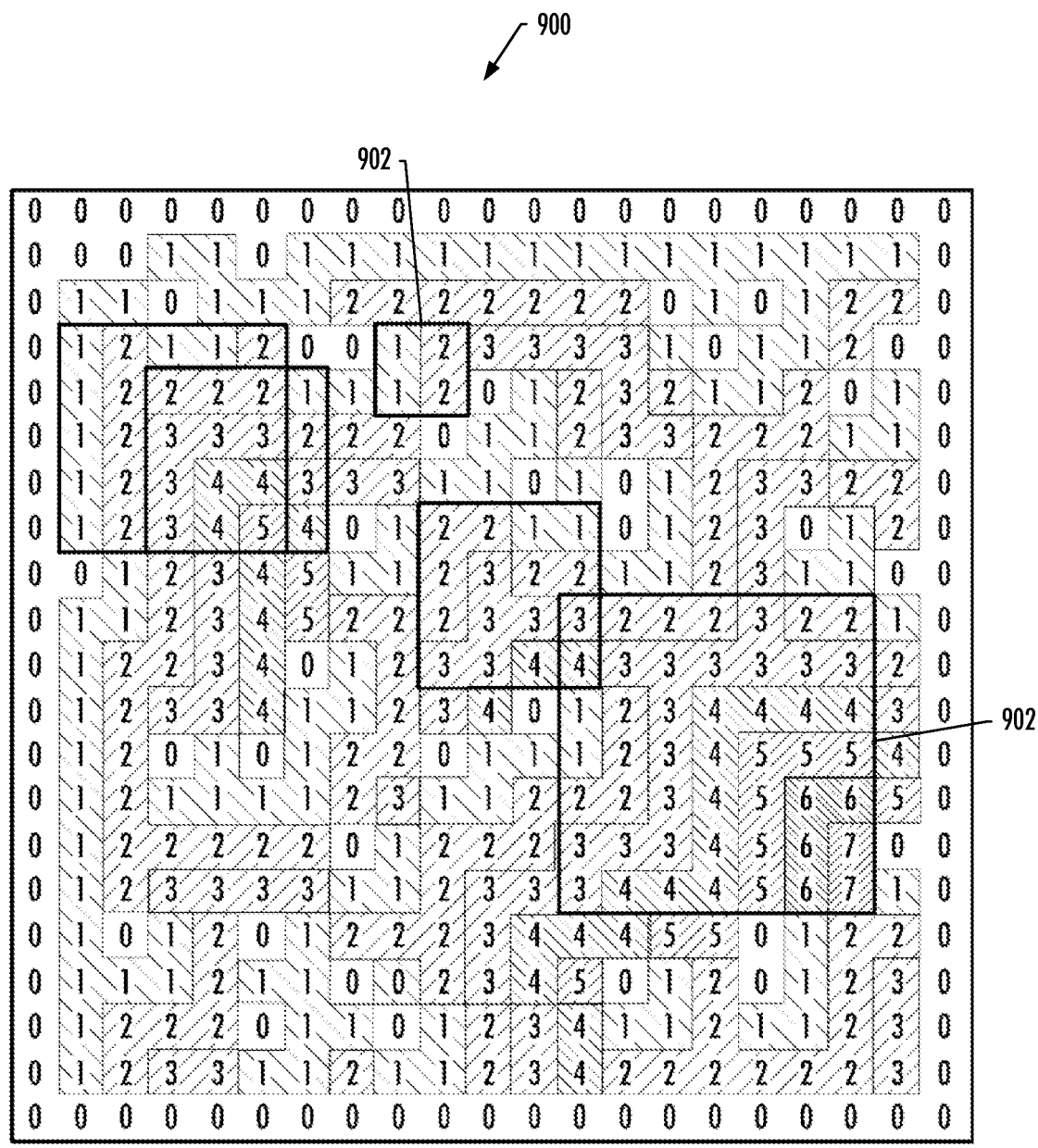
Figure 10A:
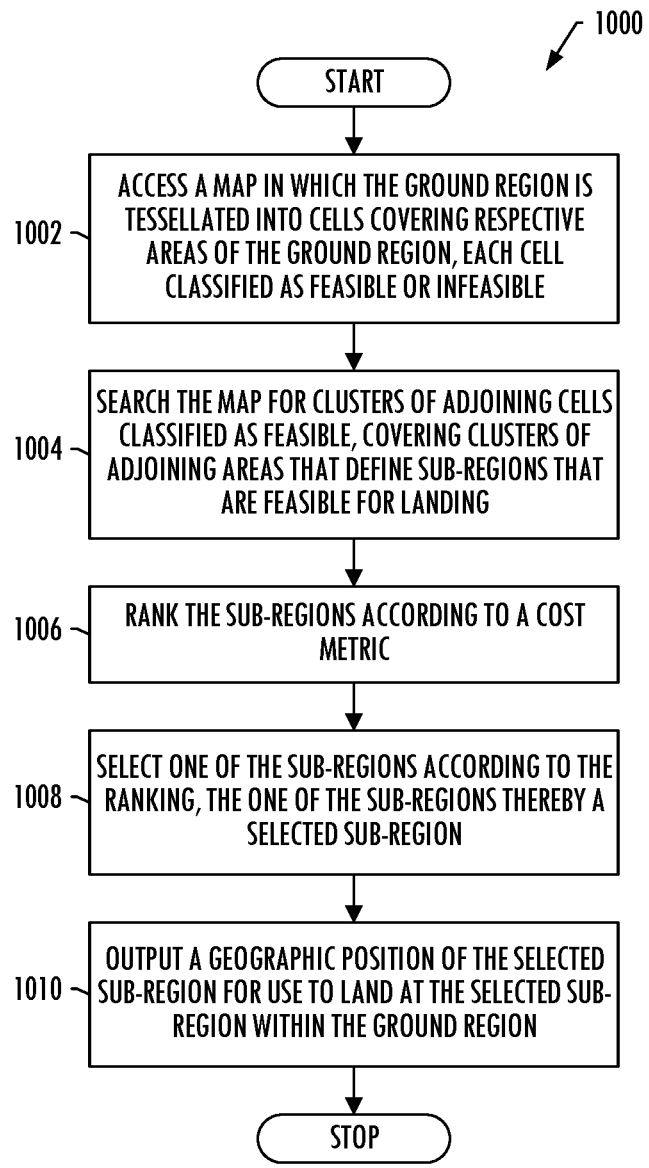
Figure 10B:
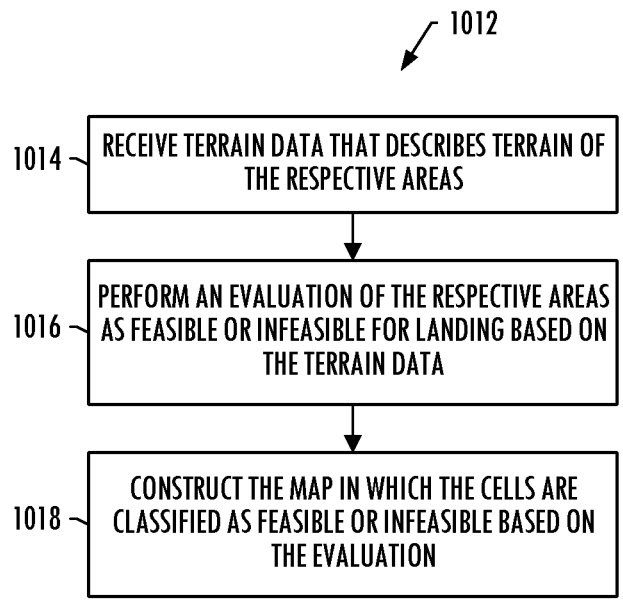
Figure 10C:
Figure 10D:
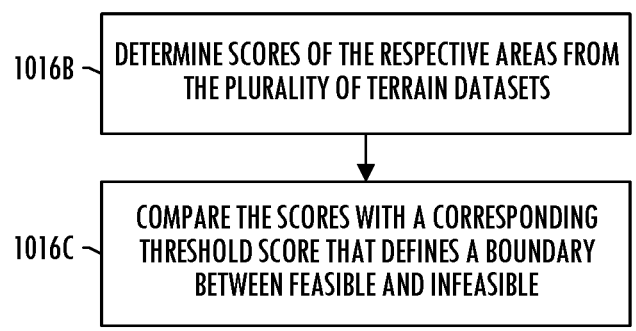
Figure 10E:
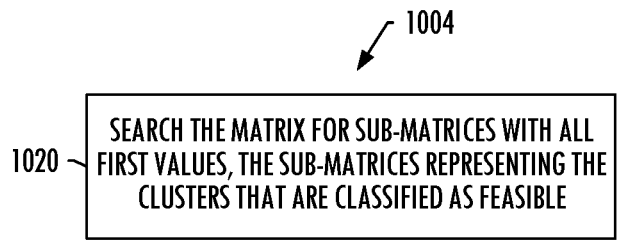
Figure 10F:
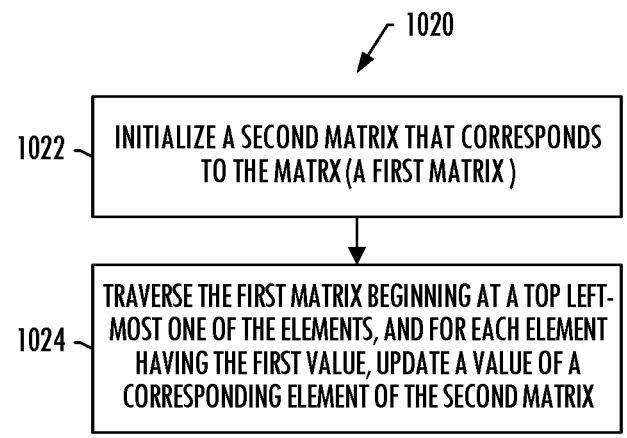
Figure 10G:
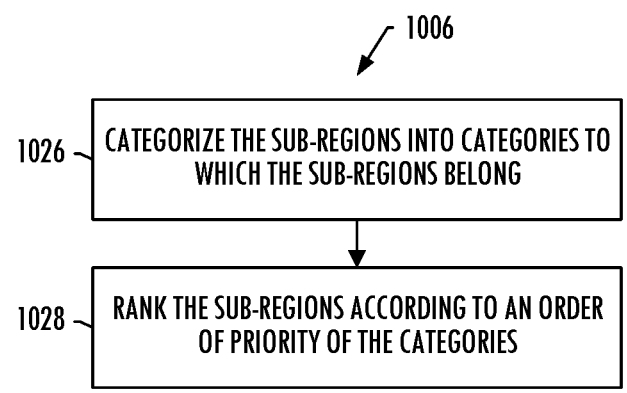
Figure 11:
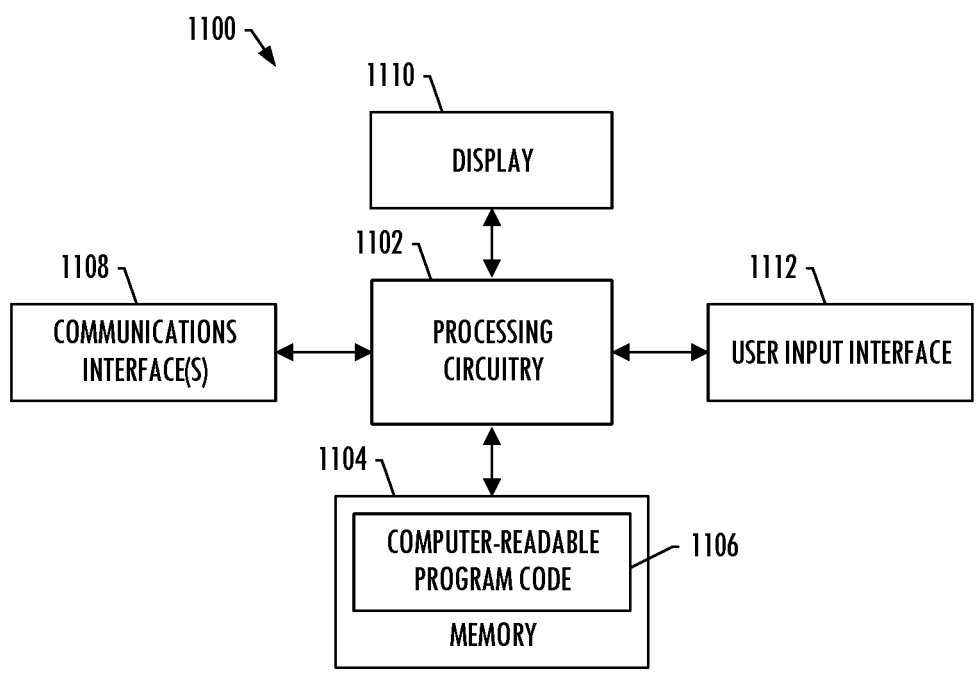

FIG. 3 more illustrates a mission management system (MMS) according to some example implementations;

FIG. 4 illustrates a scenario in which a robot is executing a mission in which the robot is to travel on a route to a destination with a ground region, according to some example implementations;

FIG. 5 is a diagram of services that may be implemented by the MMS for supporting one or more robots (in particular one or more aerial robots), according to some example implementations;

FIGS. 6 and 7 illustrate maps in which a ground region is tessellated into cells covering respective areas of the ground region, according to some example implementations;

FIG. 8 illustrates terrain data including terrain datasets embodied as characteristic maps of a ground region, according to some example implementations;

FIG. 9 illustrates a map expressed as a matrix of values that indicate sub-regions classified as feasible for landing a robot, according to some example implementations;

FIGS. 10A, 10B, 10C, 10D, 10E, 10F and 10G are flowcharts illustrating various steps in a method of supporting one or more robots landing within a ground region, according to example implementations; and FIG. 11 illustrates an apparatus according to some example implementations.

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless specified otherwise or clear from context, references to first, second or the like should not be construed to imply a particular order. A feature may be described as being above another feature (unless specified otherwise or clear from context) may instead be below, and vice versa; and similarly, features described as being to the left of another feature else may instead be to the right, and vice versa. As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Like reference numerals refer to like elements throughout. Furthermore, it should be understood that unless otherwise specified, the terms "data," "content," "digital content," "information," and similar terms may be at times used interchangeably.

Example implementations of the present disclosure relate generally to robotics and, in particular, to one or more of the design, construction, operation or use of robots. As used herein, a robot is a machine designed and configurable to execute maneuvers in its environment. The robot may be manned or unmanned. The robot may be fully human-controlled, or the robot may be semi-autonomous or autonomous in which at least some of the maneuvers are executed independent of or with minimal human intervention. In some examples, the robot is operable in various modes with various amounts of human control.

A robot designed and configurable to fly may at times be referred to as an aerial robot. A robot designed and configurable to operate with at least some level of autonomy may at times be referred to as an autonomous robot, or an autonomous aerial robot in the case of an autonomous robot that is also designed and configurable to fly. Examples of suitable robots include aerobots, androids, automatons, autonomous vehicles, explosive ordnance disposal robots, hexapods, industrial robots, insect robots, microbots, nanobots, military robots, mobile robots, rovers, service robots, surgical robots, walking robots and the like. Other examples include a variety of unmanned vehicles, including unmanned ground vehicles (UGVs), unmanned aerial vehicles (UAVs), unmanned surface vehicles (USVs), unmanned underwater vehicles (UUVs), unmanned spacecraft and the like. These may include autonomous cars, planes, trains, industrial vehicles, fulfillment center robots, supply-chain robots, robotic vehicles, mine sweepers, and the like.

Figure 1:
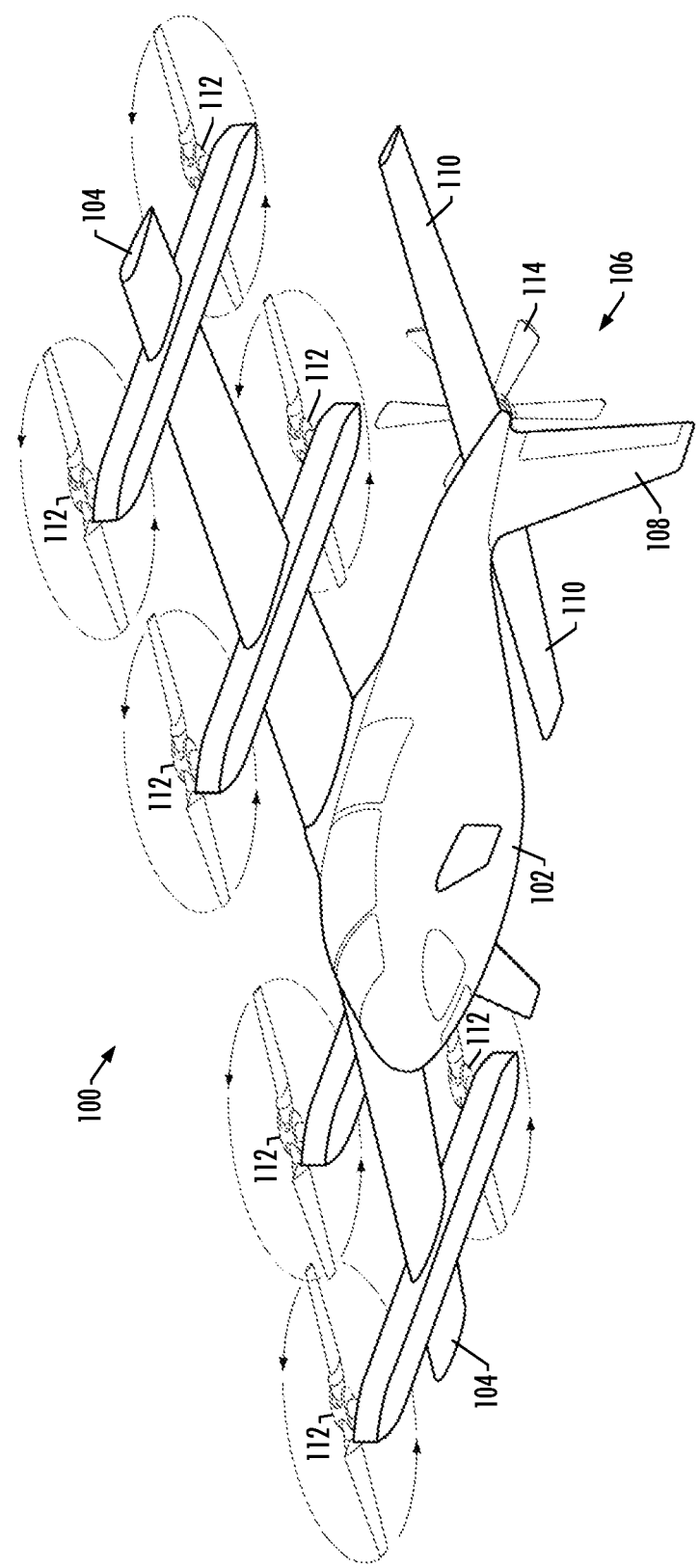
FIG. 1 illustrates one type of robot, namely, an unmanned aerial vehicle, that may benefit from example implementations of the present disclosure.

FIG. 1 illustrates one type of robot, namely, a UAV 100, that may benefit from example implementations of the present disclosure. As shown, the UAV generally includes a fuselage 102, wings 104 extending from opposing sides of the UAV in a mid-section of the fuselage, and an empennage or tail assembly 106 at a rear end of the fuselage. The tail assembly includes a vertical stabilizer 108 and two horizontal stabilizers 110 extending from opposing sides of the UAV. Rotors 112 and 114 are mounted to respectively the wings and the end of the tail assembly for lifting and propelling the UAV during flight.

Figure 2:
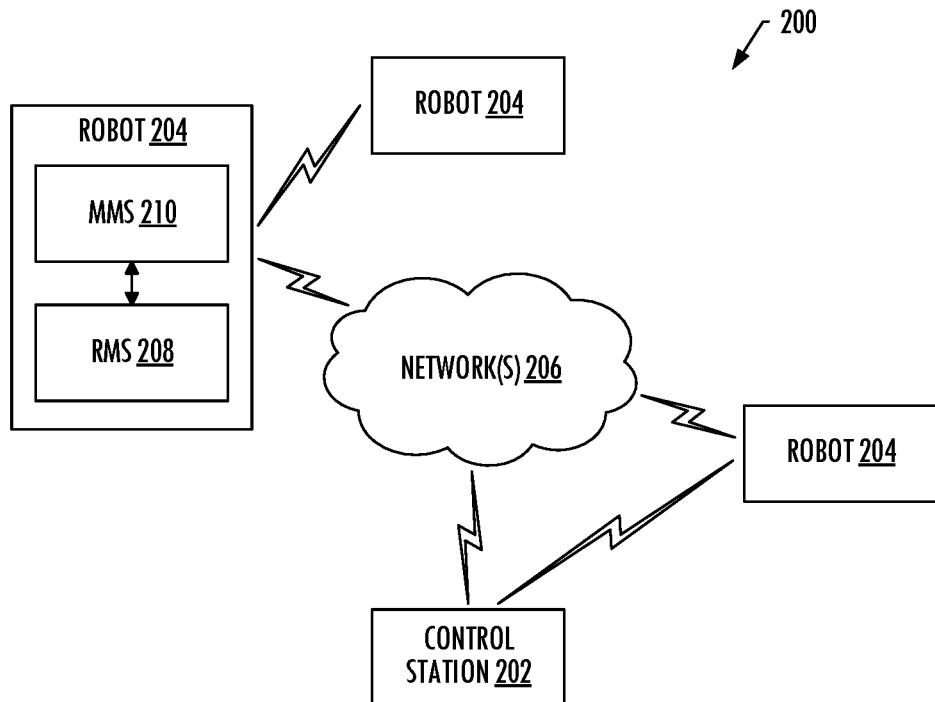
FIG. 2 illustrates a system according to some example implementations.

FIG. 2 illustrates a system 200 according to some example implementations of the present disclosure. The system may include any of a number of different subsystems (each an individual system) for performing one or more functions or operations. As shown, in some examples, the system includes a control station 202 and one or more robots 204 (e.g., one or more UAVs 100). The control station provides facilities for communication with or control of the one or more robots, such as by wired or wireless data links directly or across one or more networks 206. In some examples, the control station may be a ground station, and not in all cases control the robots. In this regard, the control station may be configured to monitor the robots. The control station may initiate mission, but the control station may not control the robots to maneuver. At times, then, the control station may enable or provide a distributed network/server of software functions.

The robot 204 includes a robot management system (RMS) 208 and a mission management system (MMS) 210. The RMS is a robot-specific subsystem configured to manage subsystems and other components of the robot. These subsystems and other components include, for example, maneuver controls, landing gear, onboard environmental systems, electrical, pneumatic and hydraulic systems, communications systems, navigation systems and other subsystems and components for controlling operation and maneuvering of the robot. The RMS is configured to accept maneuver commands such as waypoints and/or steering commands, and control the robot to follow those maneuver commands. In the context of a vehicle, the RMS is at times referred to as a vehicle management system (VMS).

The MMS 210 is a subsystem configured to manage missions of the robot 204. A mission is a deployment of the robot (one or more robots) to achieve one or more mission objectives. A mission may be decomposed into maneuvers of the robot with optional sensor and/or effector scheduling, and the MMS may execute tasks to manage the robot to execute maneuvers with specific parameters and capabilities. The MMS 210 includes subsystems to process sensor data to situational awareness, plan tasks for the robot 204 (or multiple robots), coordinate with teams to assign tasks, execute assigned tasks. The MMS is also configured to interface with the RMS 208, and in some examples the control station 202. Although the MMS is shown on the robot 204, the MMS may instead be at the control station; or in some examples, the MMS may be distributed between the robot and the control station.

In some examples, the MMS 210 provides a complete, end-to-end autonomy architecture with open system architecture standards and parameterized to allow rapid extension and reapplication to a variety of robots. The flexibility of the MMS enables an operator to code it once, but to apply it anywhere. The MMS may therefore be applied to virtually any robot that applies, or benefits from, autonomy. The MMS may include an adaptable autonomy architecture that is applicable to a variety of robots, including those identified above. A benefit of the MMS is therefore not only in the specific contents, but also in the specific details of the architecture, its subroutines, and in the interfaces between those subroutines and other systems/devices that support rapid extensibility and adaptability of the MMS to a variety of domains.

FIG. 3 more particularly illustrates the MMS 210 according to some example implementations of the present disclosure. The MMS may include any of a number of different subsystems (each an individual system) for performing one or more functions or operations. As shown, in some examples, the MMS includes an interface subsystem 302, a situational awareness subsystem 304, a mission planning subsystem 306, a mission coordination subsystem 308, and a mission execution subsystem 310. As suggested above, in some examples, the subsystems of the MMS may be on the robot 204, at the control station 202, or distributed between the robot and the control station. The subsystems may be configured to communicate with one another directly, over a communication bus 312, or across the network(s) 206 in examples in which the MMS is distributed between the robot and the control station.

The subsystems enable the MMS 210 of the robot 204 to interface with the system 200, perform situational awareness, plan a mission including a plurality of tasks, coordinate the plurality of tasks and thereby the mission with other robots 204, and execute the mission. For example, the MMS may use the interface subsystem 302 to interface with various sensors onboard the robot, the RMS 208, the control station 202 and/or other robots. The MMS may use the situational awareness subsystem 304 to acquire sensor data and maintain an awareness of the state of the environment in which the robot is operating. The MMS may use the mission planning subsystem 306 to plan a mission including or associated with a plurality of tasks, and which may incorporate rules of engagement, tactics and other constraints on operations. The MMS may likewise use the mission planning subsystem to dynamically replan a mission in which changes to the mission are made in real-time or near real-time as the mission is executed. The MMS may use the mission coordination subsystem 308 to coordinate the plurality of tasks of the mission with other robots and users, where agreed-upon tasks may then be executed by the MMS using the mission execution subsystem 310.

In some examples, the mission planning subsystem 306 is configured to plan a mission, and provide mission data for the mission to the mission execution subsystem 310 (directly or via the mission coordination subsystem 308). The mission and in particular the plurality of tasks of the mission may then be executed through the mission execution subsystem using the mission data. This may include the MMS 210 configured to send one or more maneuver commands to the RMS 208 to control the robot to follow the maneuver commands and thereby execute respective maneuvers.

According to some example implementations of the present disclosure, the MMS 210 is also configured to implement software functionality or functionalities (at times referred to as services) during a mission to support the robot 204 (in particular an aerial robot). During a mission, the robot may take a path, and this path may be described by a series of waypoints that define a route the robot will travel. The robot travels with a velocity (speed and direction of motion), and the series of waypoints and velocities at that define the route with respect to time defines a trajectory of the robot (at times referred to as a track of the robot). FIG. 4 illustrates a scenario 400 in which the robot is executing a mission in which the robot is to travel on a route 402 to a destination 404 with a ground region 406, according to some example implementations. The destination may be expressed in a number of different manners, such as a zone in which the aerial robot may land, i.e., a landing zone (LZ). The landing zone may include a prepared landing pad and be considered a prepared landing zone, or the landing zone may be unprepared without a landing pad but otherwise feasible for landing the robot.

FIG. 5 is a diagram of services 500 that may be implemented by the MMS 210 for supporting one or more robots 204 (in particular aerial robots) landing, according to some example implementations. As shown, the services may include a manager 502 service, a site selection 504 service and a zone evaluation 506 service. In some examples, the manager service and site selection service may be implemented by the mission execution subsystem 310 of the MMS, and the zone evaluation service may be implemented by the situational awareness subsystem 304.

According to some example implementations, the manager 502 service is configured to manage execution of a mission including a plurality of tasks, and which includes travel of one or more robots 204 on a route 402 to a destination 404 with a ground region 406. The manager service is configured to call on the site selection 504 service to provide a geographic position of a sub-region of the ground region, which in some examples is expressed as the sub-region's ECEF (earth-centered, earth fixed) position. The site selection service may select the sub-region based on its feasibility for landing, and from an evaluation using terrain data from the zone evaluation 506 service. The manager service is configured to use the geographic position of the selected sub-region in at least one of guidance, navigation or control of the one or more robots 204 to land at the selected sub-region.

In some examples, the site selection service for one robot may provide the geographic position of the selected sub-region to the manager service of the robot 204. Additionally or alternatively, the site selection service may provide the geographic position of the selected sub-region to at least one other robot, and in particular its corresponding manager service, which may be executing the same mission as the robot. The corresponding manager service of the other robot may then similarly use the geographic position in at least one of guidance, navigation or control of the other robot to also land at the selected sub-region.

As also shown, in various examples, the selection 504 service includes one or more sub-services (each an individual service) such as a clustering 508 service and a ranking 510 service. The clustering service is configured to access a map 512 in which the ground region 406 is tessellated into cells 514 covering respective areas of the ground region. In the map, each cell is classified as feasible to indicate a respective area is feasible for landing, or infeasible to indicate the respective area is infeasible for landing.

The clustering 508 service is configured to search the map for clusters 516 of adjoining cells that are classified as feasible, covering clusters of adjoining areas that define sub-regions within the ground region 406 that are feasible for landing. The ranking 510 service is configured to rank the sub-regions according to a cost metric, and select one of the sub-regions according to the ranking. In some examples, the ranking service is configured to determine corresponding scores of the sub-regions from the cost metric; and in some of these examples, the ranking service is configured to rank the sub-regions based on the corresponding scores. The one of the sub-regions is thereby a selected sub-region. The selection 504 service is then configured to output the geographic position of the selected sub-region.

FIGS. 6 and 7 illustrate examples of suitable maps 600, 700 that in some examples may correspond to the map 512. FIG. 7 in particular illustrates an example map in which the ground region 406 is tessellated into cells 702 covering respective areas of the ground region, which may correspond to cells 514. In the map, each cell has a first value (e.g., "0") to represent the cell is classified as feasible (indicating a respective area is feasible for landing), or a second value (e.g., "1") to represent the cell is classified as infeasible (indicating the respective area is infeasible for landing). FIG. 7 further illustrates clusters 704 of adjoining cells that may correspond to clusters 516 of adjoining cells that are classified as feasible.

Returning to FIG. 5, in some examples, the selection 504 service also includes a feasibility evaluation 518 service configured to construct the map 512. In this regard, the feasibility evaluation service is configured to receive terrain data that describes terrain of the respective areas of the ground region 406. The terrain data may be received from the zone evaluation 506 service, and describe the terrain in terms of one or more parameters including one or more of elevation, roughness or surface normal. In some examples, the terrain data includes one or more terrain datasets; and in some of these examples, each terrain dataset describes the terrain of the respective areas in terms of a respective one of the one or more parameters. FIG. 8 illustrates an example of terrain data 800 including terrain datasets 802, 804, 806 embodied as characteristic maps of the ground region 406.

In some examples, the terrain data is or includes sensor data from any of a number of different sensors that may be operatively in communication with the robot 204, such as any of a number of different sensors including those employing technologies such as acoustics, radio, optics and the like. More particular examples of suitable sensors include those employing radar, lidar, infrared sensors, cameras and the like. A number of sensors such as those employing radar, lidar, infrared sensors, cameras and the like generate images from reflected electromagnetic waves (e.g., radio, infrared radiation, visible light) or mechanical waves (e.g., sound waves). These images may correspond to terrain data (e.g., characteristic maps) or be used to derive terrain data.

The feasibility evaluation 518 service is configured to receive the terrain data, perform an evaluation of the respective areas of the ground region 406 as feasible or infeasible for landing based on the terrain data, and to construct the map 512 based on the evaluation. In some examples in which the terrain data includes terrain datasets, the feasibility evaluation service is configured to compare data of the terrain dataset with a corresponding parameter threshold that defines a boundary between feasible and infeasible in terms of the respective one of the one or more parameters. In some examples, the corresponding parameter threshold is set based on one or more constraints of the one or more robots 204.

In some examples in which the one or more parameters are a plurality of parameters (e.g., elevation, roughness, surface normal), the feasibility evaluation 518 service is configured to receive a plurality of terrain datasets each of which describes the terrain in terms of a respective one of the plurality of parameters. In some of these examples, the feasibility evaluation service is configured to determine scores of the respective areas of the ground region 406 from the plurality of terrain datasets. The scores are then compared with a corresponding threshold score that defines a boundary between feasible and infeasible, which in some examples is set based on one or more constraints of the one or more robots 204.

As suggested above, in some examples, the map 512 is expressed as a matrix of first values and second values arranged in the cells 514 to cover the respective areas of the ground region 406. Again, for example, FIG. 7 illustrates a map 700 in which the ground region is tessellated into cells 702 arranged in a matrix of first values (e.g., "0") and second values (e.g., "1"). The first values represent those of the cells classified as feasible, and the second values represent those of the cells classified as infeasible. In some of these examples, the clustering 508 service is configured to search the matrix for the clusters 516 expressed as sub-matrices with all first values, which are illustrated as clusters 704 in FIG. 7. In some examples, the clustering service is configured to search the matrix for the sub-matrices with all first values that are also of a target size or within a target range of sizes set based on one or more constraints of the one or more robots 204. In this regard, the target size or target range of sizes may depend on a footprint of the robot, which may also determine or otherwise affect the scores and thereby feasibility of the respective areas of the ground region.

In some further examples, the matrix (e.g., map 700) is a first matrix of the first values and the second values that are elements of the first matrix. In some of these examples, the clustering 508 service is configured to initialize a second matrix that corresponds to the first matrix. The clustering service is configured to traverse the first matrix beginning at a top left-most one of the elements of the first matrix, and for each element of the first matrix having the first value, update a value of a corresponding element of the second matrix. After the first matrix is traversed, the value of the corresponding element of the second matrix defines a square sub-matrix having a size of the value in each dimension. FIG. 9 illustrates a map 900 expressed as a second matrix with updated values after the first matrix (e.g., map 700) is traversed, and including sub-matrices 902.

In more mathematical notation, in some further examples, the matrix (e.g., map 700) is a first matrix A of the first values and the second values that are elements a of the first matrix. In some of these examples, the clustering 508 service is configured to initialize a second matrix B that corresponds to the first matrix A with all 0's. The clustering service is configured to traverse the first matrix A beginning at a top left-most one of the elements $a_{11}$, and for each element $a_{xy}$ having the first value, update a value of a corresponding element $b_{xy}$ of the second matrix B according to:

$$b_{xy}=\min(b_{x-1,y},b_{xy-1},b_{x-1,y-1})+1$$

After the first matrix A is traversed, the value of the corresponding element $b_{xy}$ defines a square sub-matrix 902 having a size of the value in each dimension x, y, and a bottom right-most element $a_{xy}$.

Returning to FIG. 5, in some examples, the ranking 510 service is configured to rank the sub-regions (defined by clusters of adjoining areas covered by the clusters 516 of adjoining cells). One of the sub-regions is designated as nominal and ranked first, and others of the sub-regions are ranked according to the cost metric that includes distance from the others of the sub-regions to the nominal. The nominal sub-region of the ground region 406 destination 404 may be designated in a number of different manners, and in some examples, the nominal sub-region is designated in mission data provided from the mission planning subsystem 306 to the mission execution subsystem 310 of the MMS 210.

In some examples, the ranking 510 service is configured to categorize the sub-regions into categories to which the sub-regions belong, and rank the sub-regions according to an order of priority of the categories. The categories may be represented as lists where each list entry for a sub-region includes data such as one or more of the sub-region's size, geographic position (e.g., ECEF position) or cost metric. The categories may constrain the ranking of the best landing locations further than just through a cost metric.

In a more particular example, the sub-regions (classified as feasible for landing) may be categorized in order of priority as:

Category A: Sub-regions including a prepared landing pad (predefined, feasible sub-regions that have been approved);

Category B: Ideal sub-regions without a prepared landing pad (those classified as feasible and are also of the target size or within the target range of sizes);

Category C: Maximum sub-regions that are classified as feasible but are without a prepared landing pad; or Category D: Invalid sub-regions.

To meet the criteria set for category A, a sub-region may be within a certain proximity to prepared landing pads that may be indicated in the mission data. This may be determined by comparison of the $L^2$ (Euclidean) distance between the sub-region's geographic position and a list of prepared landing pad positions to a certain threshold distance T, based on the sub-region's resolution (e.g., in meters). A sub-region at a geographic position within the threshold may be deemed a category A sub-region.

Category B is for those sub-regions that are not within the certain proximity to the prepared landing pads, but that are classified as feasible and are also of the target size or within the target range of sizes. In category C are those sub-regions that do not qualify for category A or category B, classified as feasible and greater in size than the target size or target range of sizes. In category D are those sub-regions that are designated as invalid.

Returning to FIG. 5, again, the selection 504 service of the MMS 210 may provide the geographic position of a selected sub-region of the ground region 406 destination 404, such as a highest-ranked one of the sub-regions, to the manager 502 service. The manager service may use the geographic position of the selected sub-region in at least one of guidance, navigation or control of the robot 204 to the land at the selected sub-region. In some examples, the manager service is configured to cause the robot to travel to and land at the selected sub-region. This may include the MMS configured to send one or more maneuver commands to the RMS 208 to control the robot to follow the maneuver commands and thereby travel to and land at the selected sub-region.

In some examples, the selection 504 service may provide the category of the selected sub-region with its geographic position. In the case of those sub-regions designated as invalid (category D), the category may inform the manager 502 service to avoid use of the selected sub-region. This may be extended to examples in which the site selection service may provide the manager service with geographic positions of the sub-regions categorized into categories, and ranked according to an order of priority of the categories. The manager service may then select one of the sub-regions according to the ranking, wait for an update of the sub-regions from the site selection service, or use another service to select one of the sub-regions.

FIGS. 10A, 10B, 10C, 10D, 10E, 10F and 10G are flowcharts illustrating various steps in a method 1000 of supporting one or more robots 204 within a ground region 406, according to example implementations of the present disclosure. As shown at block 1002 of FIG. 10A, the method includes accessing a map 512 in which the ground region is tessellated into cells 514 covering respective areas of the ground region. In the map, each cell is classified as feasible (e.g., "0") to indicate a respective area is feasible for landing, or infeasible (e.g., "1") to indicate the respective area is infeasible for landing.

The method 1000 includes searching the map for clusters 516 of adjoining cells that are classified as feasible, covering clusters of adjoining areas that define sub-regions within the ground region 406 that are feasible for landing, as shown at block 1004. The method includes ranking the sub-regions according to a cost metric, and selecting one of the sub-regions according to the ranking, the one of the sub-regions thereby a selected sub-region, as shown at blocks 1006 and 1008. And the method includes outputting a geographic position of the selected sub-region for use in at least one of guidance, navigation or control of the one or more robots to land at the selected sub-region within the ground region, as shown at block 1010.

In some examples, the method 1000 further includes constructing the map 512, as shown at 1012 in FIG. 10B. As shown at block 1014, constructing the map includes receiving terrain data 800 that describes terrain of the respective areas, with the terrain described in terms of one or more parameters including one or more of elevation, roughness or surface normal. An evaluation of the respective areas as feasible or infeasible for landing is performed based on the terrain data, as shown at block 1016. The map (in which the cells 514 into which the ground region 406 is tessellated are classified as feasible or infeasible) is constructed based on the evaluation, as shown at block 1018.

In some examples, receiving the terrain data 800 at block 1014 includes receiving one or more terrain datasets 802, 804, 806, which in some further examples are embodied as one or more characteristic maps of the ground region 406. Each terrain dataset describes the terrain of the respective areas in terms of a respective one of the one or more parameters. In some of these examples, performing the evaluation at block 1016 includes comparing data of the terrain dataset with a corresponding parameter threshold that defines a boundary between feasible and infeasible in terms of the respective one of the one or more parameters, as shown at block 1016A of FIG. 10C. Also in some of these examples, the corresponding parameter threshold is set based on one or more constraints of the one or more robots 204.

In some examples, the one or more parameters are a plurality of parameters, and receiving the terrain data 800 at block 1014 includes receiving a plurality of terrain datasets 802, 804, 806. Similar to above, each terrain dataset describing the terrain of the respective areas in terms of a respective one of the plurality of parameters. In some of these examples, performing the evaluation at block 1016 includes determining scores of the respective areas from the plurality of terrain datasets, as shown at block 1016B of FIG. 10D. The scores are compared with a corresponding threshold score that defines a boundary between feasible and infeasible, as shown at block 1016C. In some of these examples, the corresponding threshold score is set based on one or more constraints of the one or more robots.

In some examples, the map 512 is expressed as a matrix 700 of first values and second values arranged in the cells 514 to cover the respective areas of the ground region 406. The first values represent those of the cells classified as feasible, and the second values represent those of the cells classified as infeasible. In some of these examples, searching the map at block 1004 includes searching the matrix for the clusters 516 expressed as sub-matrices with all first values, as shown at block 1020 of FIG. 10E. In some examples, searching the matrix 700 at block 1020 includes searching the matrix for the sub-matrices with all first values that are also of a target size or within a target range of sizes set based on one or more constraints of the one or more robots 204.

In some further examples, the matrix 700 is a first matrix of the first values and the second values that are elements of the first matrix. In some of these examples, searching the matrix at block 1020 includes initializing a second matrix B 900 that corresponds to the first matrix, and traversing the first matrix beginning at a top left-most one of the elements of the first matrix, as shown at blocks 1022 and 1024 of FIG. 10F. In this regard, traversing the first matrix includes, and for each element of the first matrix having the first value, updating a value of a corresponding element of the second matrix B. After the first matrix is traversed, the value of the corresponding element of the second matrix defines a square sub-matrix 902 having a size of the value in each dimension.

In some examples, ranking the sub-regions at block 1006 includes ranking the sub-regions in which one of the sub-regions designated as nominal is ranked first, and others of the sub-regions are ranked according to the cost metric that includes distance from the others of the sub-regions to the nominal. In some examples, ranking the sub-regions includes categorizing the sub-regions into categories to which the sub-regions belong, and ranking the sub-regions according to an order of priority of the categories, as shown at blocks 1026 and 1028 of FIG. 10G.

According to example implementations of the present disclosure, the MMS 210 and its subsystems including the interface subsystem 302, situational awareness subsystem 304, mission planning subsystem 306, mission coordination subsystem 308 and mission execution subsystem 310 may be implemented by various means. Means for implementing the MMS and its subsystems may include hardware, alone or under direction of one or more computer programs from a computer-readable storage medium. In some examples, one or more apparatuses may be configured to function as or otherwise implement the MMS and its subsystems shown and described herein. In examples involving more than one apparatus, the respective apparatuses may be connected to or otherwise in communication with one another in a number of different manners, such as directly or indirectly via a wired or wireless network or the like.

FIG. 11 illustrates an apparatus 1100 according to some example implementations of the present disclosure. Generally, an apparatus of exemplary implementations of the present disclosure may comprise, include or be embodied in one or more fixed or portable electronic devices. The apparatus may include one or more of each of a number of components such as, for example, processing circuitry 1102 (e.g., processor unit) connected to a memory 1104 (e.g., storage device).

The processing circuitry 1102 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 1104 (of the same or another apparatus).

The processing circuitry 1102 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 1104 is generally any piece of computer hardware that is capable of storing information such as, for example, data, computer programs (e.g., computer-readable program code 1106) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 1104, the processing circuitry 1102 may also be connected to one or more interfaces for displaying, transmitting and/or receiving information. The interfaces may include a communications interface 1108 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 1110 and/or one or more user input interfaces 1112 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 1100 may include a processing circuitry 1102 and a computer-readable storage medium or memory 1104 coupled to the processing circuitry, where the processing circuitry is configured to execute computer-readable program code 1106 stored in the memory. It will also be understood that one or more functions, and combinations of functions, may be implemented by special purpose hardware-based computer systems and/or processing circuitry which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for executing a mission within a ground region, the system comprising:
    at least one robot that includes a mission management system configured to control the at least one robot;
    an apparatus that supports the at least one robot, the apparatus comprising:
        a memory having computer-readable program code stored therein; and
        processing circuitry configured to access the memory, and execute the computer-readable program code to cause the apparatus to at least:
            access a map in which the ground region is tessellated into cells covering respective areas of the ground region, and each of the cells are classified as feasible to indicate a respective area is feasible for landing or infeasible to indicate the respective area is infeasible for landing, wherein the map is expressed as a first matrix of first values and second values arranged in the cells to cover the respective areas of the ground region, wherein the first values represent the cells classified as feasible, and the second values represent the cells classified as infeasible;
            search the map for clusters of adjoining cells that are classified as feasible, covering clusters of adjoining areas that define sub-regions within the ground region that are feasible for landing, wherein the clusters identified with only the first values are expressed as sub-matrices;
            initialize a second matrix that corresponds to the first matrix;
            traverse the first matrix beginning at a top left-most one of elements of the first matrix, and for each of the elements of the first matrix having the first value, update a value of a corresponding element of the second matrix;
            wherein after the first matrix is traversed, the value of the corresponding element of the second matrix defines a square sub-matrix of the sub-matrices having a numeric value assigned to each dimension;
            rank the sub-regions according to a cost metric; and
            select one of the sub-regions according to the ranking, the one of the sub-regions thereby being a selected sub-region; and
        wherein the apparatus is configured to communicate the selected sub-region to the mission management system of the at least one robot to direct the at least one robot to the selected sub-region within the ground region;
        wherein the apparatus being caused to rank the sub-regions includes the apparatus being caused to categorize the sub-regions into categories to which the sub-regions belong, and rank the sub-regions according to an order of priority of the categories; and
        wherein the categories include: category A having one or more of the sub-regions having a prepared landing site, category B having one or more of the sub-regions having a target size or a target range of sizes without a prepared landing site, category C having one or more of the sub-regions having a range of sizes outside of the target size or the target range of sizes without a prepared landing site, and category D having one or more of the sub-regions being invalid.

2. The system of claim 1, wherein the processing circuitry is configured to execute the computer-readable program code to cause the apparatus to further output a geographic position of the selected sub-region for use in at least one of guidance, navigation or control of the at least one robot to land at the selected sub-region within the ground region.

3. The system of claim 1, wherein the processing circuitry is configured to execute the computer-readable program code to cause the apparatus to further construct the map, including the apparatus being caused to at least:
receive terrain data that describes terrain of the respective areas, the terrain described in terms of one or more parameters including one or more of elevation, roughness or surface normal;
perform an evaluation of the respective areas as feasible or infeasible for landing based on the terrain data; and
construct the map in which the cells into which the ground region is tessellated are classified as feasible or infeasible based on the evaluation.

4. The system of claim 3, wherein the apparatus being caused to receive the terrain data includes the apparatus being caused to receive one or more terrain datasets, each terrain dataset describing the terrain of the respective areas in terms of a respective one of the one or more parameters; and
wherein the apparatus being caused to perform the evaluation includes the apparatus being caused to compare data of the terrain dataset with a corresponding parameter threshold that defines a boundary between feasible and infeasible in terms of the respective one of the one or more parameters, the corresponding parameter threshold being set based on one or more constraints of the at least one robot.

5. The system of claim 3, wherein the one or more parameters are a plurality of parameters, and the apparatus being caused to receive the terrain data includes the apparatus being caused to receive a plurality of terrain datasets, each terrain dataset describing the terrain of the respective areas in terms of a respective one of the plurality of parameters; and
wherein the apparatus being caused to perform the evaluation includes the apparatus being caused to determine scores of the respective areas from the plurality of terrain datasets, and compare the scores with a corresponding threshold score that defines a boundary between feasible and infeasible, the corresponding threshold score being set based on one or more constraints of the at least one robot.

6. The system of claim 3, wherein the apparatus being caused to receive the terrain data includes the apparatus being caused to receive one or more terrain datasets embodied as one or more characteristic maps of the ground region.

7. The system of claim 1, wherein the apparatus is caused to search for the sub-matrices with only the first values that are also of a target size or within a target range of sizes set based on one or more constraints of the at least one robot.

8. The system of claim 1, wherein the apparatus is caused to rank the sub-regions, and wherein a sub-region of one of the sub-regions is designated as nominal and is ranked first, and wherein the cost metric includes distance from others of the sub-regions, and wherein the others of the sub-regions are ranked according to the cost metric that includes the distance from the others of the sub-regions to the nominal.

9. The system of claim 1, wherein the at least one robot further includes a plurality of robots.

10. The system of claim 1, wherein the target size or the target range of sizes is dependent on a footprint of the at least one robot.

11. A method of executing a mission within a ground region, the method comprising:
accessing a map in which the ground region is tessellated into cells covering respective areas of the ground region, and each of the cells are classified as feasible to indicate a respective area is feasible for landing or infeasible to indicate the respective area is infeasible for landing, wherein the map is expressed as a first matrix of first values and second values arranged in the cells to cover the respective areas of the ground region, wherein the first values represent the cells classified as feasible, and the second values represent the cells classified as infeasible;
searching the map for clusters of adjoining cells that are classified as feasible, covering clusters of adjoining areas that define sub-regions within the ground region that are feasible for landing, wherein the clusters identified with only the first values are expressed as sub-matrices;
initializing a second matrix that corresponds to the first matrix;
traversing the first matrix beginning at a top left-most one of elements of the first matrix, and for each of the elements of the first matrix having the first value, updating a value of a corresponding element of the second matrix;
wherein after the first matrix is traversed, the value of the corresponding element of the second matrix defines a square sub-matrix of the sub-matrices having a numeric value assigned to each dimension;
ranking the sub-regions according to a cost metric;
selecting one of the sub-regions according to the ranking, the one of the sub-regions thereby being a selected sub-region;
communicating the selected sub-region to a mission management system of at least one robot to direct the at least one robot to the selected sub-region within the ground region;
wherein ranking the sub-regions includes categorizing the sub-regions into categories to which the sub-regions belong, and ranking the sub-regions according to an order of priority of the categories; and
wherein the categories include: category A having one or more of the sub-regions having a prepared landing site, category B having one or more of the sub-regions having a target size or a target range of sizes without a prepared landing site, category C having one or more of the sub-regions having a range of sizes outside of the target size or the target range of sizes without a prepared landing site, and category D having one or more of the sub-regions being invalid.

12. The method of claim 11 further comprising outputting a geographic position of the selected sub-region for use in at least one of guidance, navigation or control of the at least one robot to land at the selected sub-region within the ground region.

13. The method of claim 11 further comprising constructing the map, constructing the map including:
receiving terrain data that describes terrain of the respective areas, the terrain described in terms of one or more parameters including one or more of elevation, roughness or surface normal;

performing an evaluation of the respective areas as feasible or infeasible for landing based on the terrain data; and constructing the map in which the cells into which the ground region is tessellated are classified as feasible or infeasible based on the evaluation.

14. The method of claim 13, wherein receiving the terrain data includes receiving one or more terrain datasets, each terrain dataset describing the terrain of the respective areas in terms of a respective one of the one or more parameters; and wherein performing the evaluation includes comparing data of the terrain dataset with a corresponding parameter threshold that defines a boundary between feasible and infeasible in terms of the respective one of the one or more parameters, the corresponding parameter threshold being set based on one or more constraints of the at least one robot.

15. The method of claim 13, wherein the one or more parameters are a plurality of parameters, and receiving the terrain data includes receiving a plurality of terrain datasets, each terrain dataset describing the terrain of the respective areas in terms of a respective one of the plurality of parameters; and wherein performing the evaluation includes determining scores of the respective areas from the plurality of terrain datasets, and comparing the scores with a corresponding threshold score that defines a boundary between feasible and infeasible, the corresponding threshold score being set based on one or more constraints of the at least one robot.

16. The method of claim 13, wherein receiving the terrain data includes receiving one or more terrain datasets embodied as one or more characteristic maps of the ground region.

17. The method of claim 11, wherein searching includes searching for the sub-matrices with only the first values that are also of a target size or within a target range of sizes set based on one or more constraints of the at least one robot.

18. The method of claim 11, wherein a sub-region of one of the sub-regions is designated as nominal, and wherein ranking the sub-regions includes ranking the nominal one of the sub-region as first, and wherein the cost metric includes distance from others of the sub-region, and wherein ranking the sub-regions includes ranking the others of the sub-regions according to the cost metric that includes the distance from the others of the sub-regions to the nominal.

19. The method of claim 11, wherein the at least one robot further includes a plurality of robots.

20. The method of claim 11, wherein the target size or the target range of sizes is dependent on a footprint of the at least one robot.

* * * * *

UNITED STATES PATENT AND TRADEMARK OFFICE
CERTIFICATE OF CORRECTION

| | | |
|---|---|---|
| PATENT NO. | : 11,994,407 B2 | Page 1 of 1 |
| APPLICATION NO. | : 17/148164 | |
| DATED | : May 28, 2024 | |
| INVENTOR(S) | : Nathan Otenti, Joseph Chung and Jeffery Saunders | |

It is certified that error appears in the above-identified patent and that said Letters Patent is hereby corrected as shown below:

On the Title Page

Item (71) The Applicant: "Aurora Flight Sciences Corporation" should read --Aurora Flight Sciences Corporation, a subsidiary of The Boeing Company--

Signed and Sealed this
Tenth Day of December, 2024

Katherine Kelly Vidal
*Director of the United States Patent and Trademark Office*